UNITED STATES PATENT OFFICE.

DAVID J. OGILVY, OF CINCINNATI, OHIO.

CARBON-PIGMENT BASE AND PROCESS OF MAKING SAME.

1,268,142.  Specification of Letters Patent.  Patented June 4, 1918.

No Drawing.  Application filed July 21, 1916. Serial No. 110,604.

*To all whom it may concern:*

Be it known that I, DAVID J. OGILVY, a citizen of the United States, and a resident of the city of Cincinnati, in the county of Hamilton and State of Ohio, have invented certain new and useful Improvements in Carbon-Pigment Bases and Processes of Making Same, of which the following is a specification.

Heretofore for what is commonly called lamp black, the process consisted in burning carbonaceous material with a limited supply of air and collecting the unconsumed carbon or soot. For what is usually called carbon black, a carbonaceous flame such as a natural gas flame is impinged on a comparatively cool metallic surface, resulting in a deposit of the carbon black on the cool surface. Another method of producing a black pigment consists in impinging a carbonaceous flame on water or a wet surface.

My improved method consists in impinging a corbonaceous flame against a comparatively cool, oily or viscous resinous surface, this resulting in chilling the carbonaceous flame, thereby causing a deposit of carbon pigment on the oily or viscous resinous surface. This is quickly absorbed and leaves a fresh oily surface for further deposits of carbon from the impinging flame. My invention is to a large extent applicable to any of the ordinary systems for producing carbon pigments by the burning of carbonaceous material, either by the limited combustion or the impingement method on a plate, roll or belt, it being essential that the oily or viscous medium upon the surface on which the carbon is to be collected should be kept sufficiently cool to prevent volatilization of the oily or resinous vehicle or the reduction of the viscosity of the vehicle to excess. This object I attain by the application of cooling mediums such as water and air.

The simplest form of apparatus would consist of a thin metallic cylinder, cooled internally by a flow or spray of water and revolving over a series of carbonaceous flame jets, together with means for supplying and feeding the cylinder with the above mentioned oily or viscous resinous vehicles, also means for spreading the oily and viscous vehicles and means for removing the oily and resinous vehicles when sufficiently charged with the carbon pigment. The efficiency of any apparatus that might be used for operating my improvement would be guided by the advantages of the spreading system, the scraping and removal of the carbon impregnated vehicle and the proper distance and angle of the impinging flame from the oily surface so as to get the best results in quality, quantity and economy.

I prefer to use as a vehicle for coating the surface intended to receive the carbon deposit, high fire test oils such as linseed, mineral and rosin oils of any desired degree of viscosity required. The resulting magma from this operation consists of the oily or resinous vehicle mixed with the carbon pigment.

Among the advantages of my process are the following. The carbon pigment is deposited and absorbed by the oily or resinous vehicle at its initial separation from the burning carbonaceous material, therefore there is no coking or caking of the carbon as it is in combination with the oily vehicle, that fact preventing any overheating of the carbon.

Another advantage is the facility of removing the carbon from the surface on which it is deposited; the carbon being mixed with the oily or resinous vehicle is in a soft and easily removed condition. The hygienic condition of my process is a strong feature, there being comparatively little loss and dust. Another important matter is that the resuting magma is in good condition to act as a base for the production of printing inks, paints and the like, as the carbon pigment is in a fine state of division; therefore little or no grinding is required in many cases.

The application of the carbonaceous flame may with advantage be continued until the viscous coating is fully charged with the finely divided carbon pigment and has ceased to present any viscous surface to the impinging flame.

I claim:

1. The process of producing carbon pigments, which consists in impinging a carbonaceous flame against an oily surface.

2. The process of producing carbon pigments, which consists in impinging a carbonaceous flame against a viscous, oily surface.

3. The process of producing carbon pigments which consists in impinging a carbonaceous flame against a relatively cool, oily surface.

4. The process of producing carbon pigments, which consists in impinging a carbonaceous flame against a relatively cool, high fire test, oily surface.

5. The process of producing carbon pigments, which consists in impinging a carbonaceous flame against an incombustible surface coated with a viscous oily layer.

6. A process of obtaining carbon pigments, which consists in providing a surface coated with oily material and moving the same and an impinging carbonaceous flame relatively to each other, so as to cause the coating on said surface to continuously absorb the carbonaceous matter resulting from the impingement of the flame.

7. The process of producing a base for printing inks and the like, which consists in impinging a carbonaceous flame against an oily magma, comprising carbon pigments and the oily vehicle, and in collecting, absorbing and mixing the resulting product.

8. The process of producing carbon pigments, which consists in impinging a carbonaceous flame against a comparatively cool, oily surface and continuing the impingement so long as said surface retains its oily character.

9. In the process of producing carbon pigments, which consists in impinging a carbonaceous flame against an oily surface, and utilizing a relatively cool, oily surface as a means of collecting and absorbing the carbon pigment escaping from the impinging carbonaceous flame.

10. A new product as a base for printing inks, paints and the like, comprising an oily material mixed with carbon derived from an impinging flame upon the oily material until charged therewith.

11. A new product as a base for printing inks, paints and the like, comprising a viscous oily material mixed with carbon derived from an impinging flame upon comparatively cool, oily material until charged therewith.

DAVID J. OGILVY.